United States Patent
Schoen et al.

(10) Patent No.: US 7,525,497 B2
(45) Date of Patent: Apr. 28, 2009

(54) MICROWAVE-ATTENUATING COMPOSITE MATERIALS, METHODS FOR PREPARING THE SAME, INTERMEDIATES FOR PREPARING THE SAME, DEVICES CONTAINING THE SAME, METHODS OF PREPARING SUCH A DEVICE, AND METHODS OF ATTENUATING MICROWAVES

(75) Inventors: Paul E. Schoen, Alexandria, VA (US);
Ronald R. Price, Stevensville, MD (US); Joel M. Schnur, Burke, VA (US);
Daniel Zabetakis, Brandywine, MD (US); Robert F. Brady, Jr., Gaithersburg, MD (US); Ann Mera, Huntingtown, MD (US); Dana Leamann, Frederick, MD (US);
Bor-Sen Chiou, Pinole, CA (US);
Walter J. Dressick, Fort Washington, MD (US)

(73) Assignees: The United States of America as represented by the Secretary of the Navy, Washington, DC (US); Science Applications International Corporation, San Diego, CA (US)

( * ) Notice: Subject to any disclaimer, the term of this patent is extended or adjusted under 35 U.S.C. 154(b) by 459 days.

(21) Appl. No.: 11/223,263

(22) Filed: Sep. 12, 2005

(65) Prior Publication Data

US 2006/0246220 A1 Nov. 2, 2006

Related U.S. Application Data

(62) Division of application No. 10/353,952, filed on Jan. 30, 2003, now Pat. No. 7,125,476.

(51) Int. Cl.
*H01Q 1/12* (2006.01)
(52) U.S. Cl. .................. 343/718; 204/165; 204/167
(58) Field of Classification Search .............. 343/718; 204/165, 167
See application file for complete search history.

(56) References Cited

U.S. PATENT DOCUMENTS

| | | | |
|---|---|---|---|
| 4,135,015 A * | 1/1979 | Boyden et al. | 428/373 |
| 5,650,787 A | 7/1997 | Lim et al. | |
| 6,452,564 B1 | 9/2002 | Schoen et al. | |
| 7,125,476 B2 * | 10/2006 | Schoen et al. | 204/165 |
| 2003/0072781 A1* | 4/2003 | Pelerin | 424/401 |
| 2003/0099574 A1 | 5/2003 | Bentsen et al. | |
| 2004/0063915 A1 | 4/2004 | Diner et al. | |
| 2004/0111144 A1* | 6/2004 | Lawin et al. | 623/1.11 |

OTHER PUBLICATIONS

Browning, et al., "Fabrication and radio . . . near percolation", 1998 American Institute of Physics.

* cited by examiner

*Primary Examiner*—Tho G Phan
(74) *Attorney, Agent, or Firm*—Oblon, Spivak, McClelland, Maier & Neustadt, P.C.

(57) ABSTRACT

The present invention provides microwave attenuating, filled composite materials which contain a polymer or ceramic matrix and metallic tubules and processes for making the same and devices which contain such materials.

4 Claims, 1 Drawing Sheet

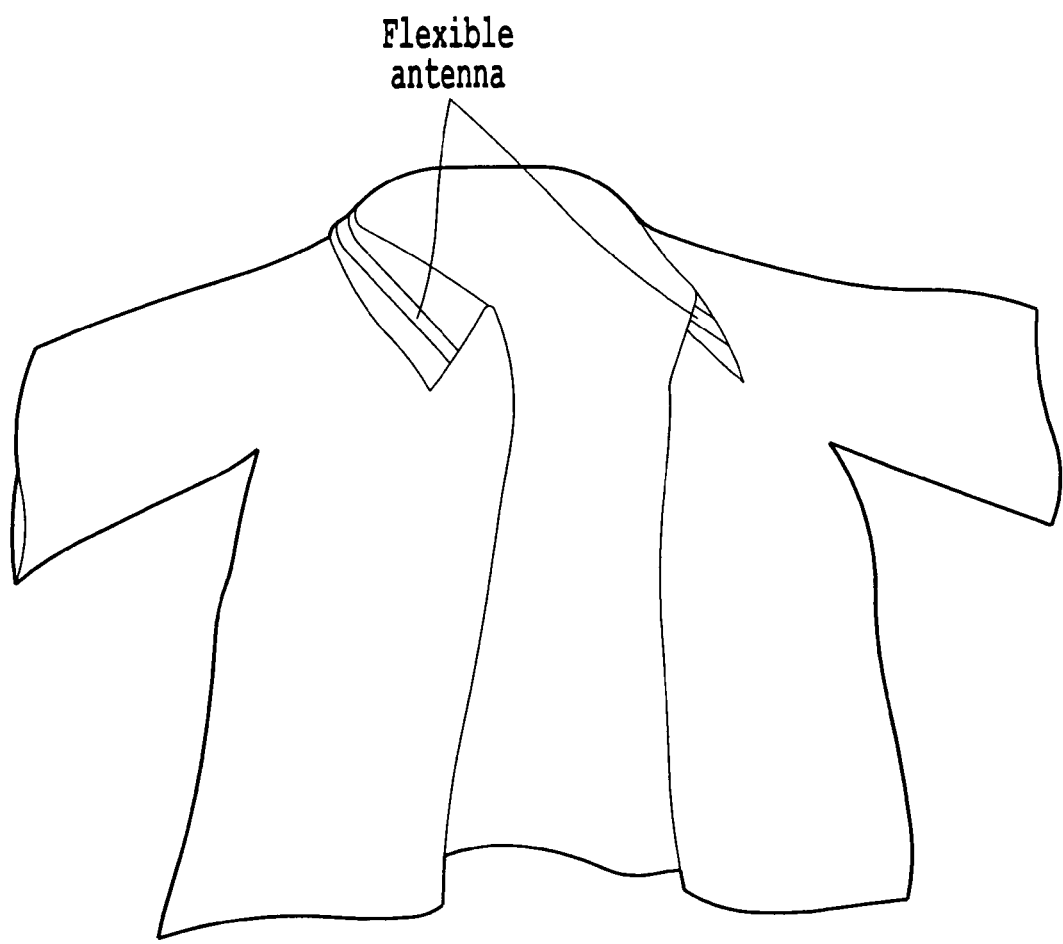

US 7,525,497 B2

MICROWAVE-ATTENUATING COMPOSITE MATERIALS, METHODS FOR PREPARING THE SAME, INTERMEDIATES FOR PREPARING THE SAME, DEVICES CONTAINING THE SAME, METHODS OF PREPARING SUCH A DEVICE, AND METHODS OF ATTENUATING MICROWAVES

CROSS-REFERENCE TO RELATED APPLICATIONS

The present application is a divisional of U.S. Ser. No. 10/353,952, filed on Jan. 30, 2003, the contents thereof are incorporated herein by reference.

BACKGROUND OF THE INVENTION

1. Field of the Invention

The present invention relates to microwave-attenuating composite materials. The present invention also relates to methods for preparing such microwave-attenuating composite materials. The present invention also relates to intermediates useful for preparing such microwave-attenuating composite materials. The present invention further relates to devices containing such microwave-attenuating composite materials and methods for preparing such devices. The present invention additionally relates to methods for attenuating microwaves. More specifically, the present invention relates to methods for absorbing microwave radiation, for signal attenuation at appropriate wavelengths, and for isolating transmitting antennas and receiver components in radar sets.

2. Discussion of the Background

Electronic devices are becoming increasingly compact and complex. At microwave frequencies, cross-talk and ringing are becoming serious problems that need to be addressed. In particular, devices such as cellular telephones, pagers, and palm- or lap-size computers contain many circuits that require isolation from each other for maximum performance. In addition, military platforms such as ships and aircraft operate a variety of radio and radar systems that may interfere with each other, thus requiring isolation measures. These systems may consist of passive devices, active devices, or mixtures thereof. The number, sophistication, and cost of these systems continue to rise, while the demand for improved performance moves forward at an even a faster pace.

In order to prevent cross-talk, it is necessary to isolate the components of electronic devices. This may be accomplished by placing a material of defined and controllable shape, which absorbs interfering frequencies of radiation, between the components. However, the gap where the isolating material is placed may be small, complex in shape, and hard to reach. In addition, the isolating material is preferably dimensionally stable, compact and lightweight, chemically inert and mechanically robust, and unaffected by its operating environment.

At present, numerous microwave-absorbing composite materials are made from organic matrix resins and carbonyl iron powder. Typically, the carbonyl iron powder has a density near 7.9 g/cm$^3$, and the composite has a density near 5 g/cm$^3$. The high density of the conventional microwave-absorbing materials presents the serious drawback of imparting a dramatic increase in the weight of any device incorporating such a material, which is especially undesirable in portable, or hand-held devices, such as mobile telephones, lap-top computers, or aircraft.

Moreover, conventional microwave-attenuating materials are not as effective as desired. In this regard, it is noted that on a commercial or industrial scale even small improvements in absorbing microwave radiation, signal attenuation, and isolation of signal devices are economically significant.

Therefore, there remains a critical need for microwave-attenuating composite materials, which do not suffer from this drawback. There also remains a need for methods for preparing such microwave-attenuating composite materials and intermediates useful for preparing such microwave-attenuating composite materials. In addition, there remains a need for devices, which contain such a microwave-attenuating composite material, and methods for preparing such devices. There also remains a need for improved methods of attenuating microwaves.

SUMMARY OF THE INVENTION

Accordingly, it is one object of the present invention to provide novel composite materials, which are useful for attenuating microwaves.

It is another object of the present invention to provide novel methods for preparing such composite materials.

It is another object of the present invention to provide novel intermediates which are useful for preparing such composite materials.

It is another object of the present invention to provide novel devices, which contain such a composite material.

It is another object of the present invention to provide novel methods for preparing such devices.

It is another object of the present invention to provide novel methods for attenuating microwaves.

These and other objects, which will become apparent during the following detailed description, have been achieved by the inventors' discovery that composite materials, which comprise:

(a) a polymer or ceramic matrix; and
(b) a plurality of metal microtubules dispersed within said matrix, are effective for the attenuation of microwaves.

The inventors have also discovered that such composite materials may be prepared by a method comprising:

(1) incorporating a plurality of metal microtubules in a polymer or ceramic matrix.

The inventors have also found that such composite materials may be prepared from an intermediate, which comprises:

(a) a polymer matrix precursor or a ceramic matrix precursor; and
(b) a plurality of metal microtubules dispersed within said polymer matrix precursor or said ceramic matrix precursor.

The inventors have also discovered that electronic devices, which comprise a microwave-attenuating composite, said composite comprising (a) a polymer or ceramic matrix; and
(b) a plurality of metal microtubules dispersed within said matrix, exhibit a reduction in the problems associated with or caused by ineffective attenuation of microwaves.

The inventors have additionally found that such devices may be prepared by a process, which comprises:

(1) incorporating a microwave-attenuating composite material in an electronic device, wherein said microwave-attenuating composite material comprises:

(a) a polymer or ceramic matrix; and
(b) a plurality of metal microtubules dispersed within said matrix.

The inventors have also found that microwaves may be effectively attenuated between a source point and a detection point by a method, which comprises:

(1) placing a microwave-attenuating composite material between said source point and said detection point, wherein said microwave-attenuating composite material comprises:

(a) a polymer or ceramic matrix; and (b) a plurality of metal microtubules dispersed within said matrix.

BRIEF DESCRIPTION OF THE FIGURE

A more complete appreciation of the invention and many of the attendant advantages thereof will be readily obtained as the same becomes better understood by reference to the following FIGURE in conjunction with the detailed description below. The FIGURE shows a flexible antenna in clothing as exemplified by a flexible antenna in the collar of a shirt. This FIGURE is intended to solely serve as an exemplary embodiment of the present invention and in no way defines or limits the scope of the present invention.

As will be recognized from the following detailed description, the flexibility, density, frequency response, and environmental stability of the present microwave-attenuating composite materials may be varied as desired over wide ranges.

DETAILED DESCRIPTION OF THE PREFERRED EMBODIMENTS

Thus, in the first embodiment, the present invention provides composite materials, which comprise:

(a) a polymer or ceramic matrix; and (b) a plurality of metal microtubules dispersed within said matrix, which are effective for the attenuation of microwaves.

In the context of the present invention, the term "microwaves" refers to electromagnetic radiation having a frequency of 100 MHz to 200 GHz.

In the case of a polymer matrix, the matrix may be formed of any suitable polymer material. A wide variety of polymers may be used as the matrix resin in this invention. These include but are not limited to vinyl, styrene-butadiene, natural rubber, nitrile rubber, and acrylic resins, in addition to a polyurethane, an epoxy, or a siloxane. These polymers may be used singly or in combination; when used in combination the amount of each may be adjusted to optimize the performance of the composite. In general, the polmer matrix resin may be obtained by premixing the base component, followed by the addition of a curing agent. Preferred curing agents include diisocyanate prepolymers containing a plasticizer, polyoxypropylenediamine, and copolymers of methylhydrosilane and dimethylsiloxane. In this case, none of the ingredients of the resin are volatile, and shrinkage during curing is less than 0.1%. Although, each of the resins cures at room temperature, heating the liquid mixture to 60° C. may accelerate curing.

Especially preferred elastomeric polymers include epoxy resins and polyurethanes.

In the case of a ceramic mixture, the matrix may be likewise any conventional ceramic, provided that the ceramic matrix may be formed from a mixture of ceramic matrix precursor(s) and metal microtubules under conditions which do not destroy the desired attenuation. Suitable ceramics are described in Kirk-Othmer, Encyclopedia of Chemical Technology, 4$^{th}$ Ed., Wiley Interscience, NY, vol. 5, pp. 599-728 (1993), which is incorporated herein by reference. Ceramics which are prepared from a sol/gel precursor(s) are particularly preferred.

The term metal microtubule refers to any metal or metallized cylinder having a length of 2 to 200 micrometers (μm), preferably 5 to 100 μm, more preferably 10 to 30 μm; an outside diameter of 0.5 to 3.0 μm, preferably 0.5 to 2.0 μm, more preferably 1.0 to 2.0 μm; an inside diameter of 0 to 0.5 μm, preferably 0.01 to 0.5 μm, more preferably 0 to 0.4 μm, even more preferably 0.01 to 0.4 μm, still more preferably 0 to 0.3 μm, even more preferred 0.01 to 0.3 μm. Preferably, the metal microtubule is electrically conductive and resistant to oxidation. In this case, the use of microtubules with a Ni overcoat to protect against oxidation is preferred.

The preparation of such metal or metallized microtubules is described in detail in U.S. Pat. Nos. 4,911,981; 5,049,382; 5,342,737; 5,814,414; and 6,280,759, all of which are incorporated herein in their entirety by reference.

Two types of microtubules, lipid and halloysite, are especially preferred for use in the present invention. Lipid microtubules self-assemble from water-alcohol solutions of biologically-derived diacetylenic lipids and precipitate at the appropriate temperature and concentration. Electroless metallization processes deposit an electrically conductive coating of copper, nickel, iron, other electroless metals, or combinations thereof upon the lipid microtubules. The lipid may then be withdrawn from the center of the microtubule and reused. The resulting metallized microtubules have high aspect ratios (20-200), low density, and impart appreciable permittivity when used in organic matrix resins. These materials are described more fully in U.S. Pat. No. 6,013,206, which is incorporated herein by reference in its entirety.

A further method to form the electroless-plated metallic microtubules is to process the lipid microtubules in such a manner to yield a suspension of the lipid at a concentration of about 2.5 mg/ml in a mixed solvent consisting of about 70% of an alcoholic mixture and about 30% distilled water, wherein the alcoholic mixture consists of about 20 to 80% methanol and about 20 to 80% ethanol. Once formed, the microtubules are subjected to a polyanion mixture, such as polystyrenesulfonate, at a dilution of 0.1 to 1.0 mg/ml in distilled water.

The polyanion is allowed to bind to the lipid microtubules for 15 to 45 minutes. After the incubation period, the mixture is diluted with an equivalent volume of a polycation mixture, such as polyethyleimine or a chitosan, at a dilution of 0.5 to 1.5 mg/ml. It may be advantageous to cross-link the polycationic layer to promote stability by the use of gluteraldehyde, or another suitable crosslinking agent, at concentrations sufficient to cross-link the polyion layers.

In order to prevent the accumulation of an excess amount of polyelectrolyte and therefore excess bundling and bridging of the microtubules it is necessary to use a slightly deficit amount of the polyion so that the polyion in solution will be 100% bound to the tubule surface and not found in excess in the supernatant solution. One approach to calculate the amount of polyion to be added is to determine the total surface charge available for binding by titrating the tubule surface with a charged dye complex such as Toluidine Blue O for the determination of the net negative charge available or the use of a dye such as FastUSOL Red 50L for polyanions. In order to facilitate the titration, a known quantity of the tubule suspension or dispersion is titrated with a known dilution of the dye stuffs such that the dye is added to the tubule/polyion suspension and allowed to bind for 15 minutes. Then the tubules may be spun out of solution at 2000 g and the supernatant is analyzed by visible spectrophotometry for the presence of unbound dye in solution. The titration is complete when the dye is found to remain in solution following the binding period. The amount of dye added is calculated and the amount of charge determined. Then the appropriate amount of the oppositely charged polyion is added to the solution and allowed to bind, and the process is repeated until the required number of layers is obtained.

The microtubule suspension is then allowed to settle by gravity or may be filtered to remove the excess polyion solution and the excess alcohol. However, this step is not necessary, if the concentration of alcohol at this point is insufficient to precipitate the metal salts. The microtubules are then resuspended in distilled water to the original volume used for microtubule production. The final concentration of lipid should be 2.0 to 2.5 mg/ml. A catalytic mixture of palladium salts is added at a volume ratio of 1:500 of catalyst solution or dispersion to microtubule suspension. The catalyst is allowed to bind to the polyion complexes for a minimum of 30 minutes followed by immediate plating.

The resultant catalyzed microtubules may be electroless coated with simple formulations of copper, nickel, cobalt or iron or permalloy metal to a thickness that is sufficient to result in a conductive coating. Especially preferred are copper-coated, nickel-coated, cobalt-coated, and iron-coated lipid tubules, nickel or cobalt over copper-coated lipid tubules, and iron and nickel coatings over lipid tubules.

The methods of electroless coating are described more fully in U.S. Pat. No. 5,089,742, which is incorporated herein by reference in its entirety.

The present composite materials typically comprise the polymer or ceramic matrix in an amount of 40 to 99% by weight, preferably 48 to 99% by weight, more preferably 50 to 90% by weight, based on the total weight of the composite material. The tubules are suitably present in an amount of 1 to 60% by weight, preferably 1 to 52% by weight, more preferably 10 to 50% by weight, based on the total weight of the composite material.

Other types of materials which may be present in the composite material include stabilizers (e.g., light absorbers such as carbon black and/or UV absorbers), plasticizers, fungicides, bacteriocides. Such ingredients may be present in any amount such that the desired level of attenuation is retained.

The composite material may further contain one or more magnetic powdered metals and/or metal oxides, such as iron powder and/or ferrite powder.

It is also to be understood that the present composite material can be in the form of any suitable shape. Thus, when the composite material is used on the inside of a device, it may be preferred that the composite material have a shape which conforms to the open space(s) or interstice(s) between components within the device or the space(s) or interstice(s) between one or more components in the device and all or part of a housing or casing of the device.

The present composite materials may also be applied to the outside of a device. In this case, it may be preferred that the composite material be flexible so that it will conform to the outside of the device. If desired, the rigidity or flexibility of the composite material can be modified using conventional techniques to fit the application. In this case, it may also be preferred to initially form the composite material in the form of a flexible sheet of arbitrary length and width, which may be cut to shape at the time of application. In this type of application, the composite material will typically have a thickness of 0.025 to 2.5 millimeters (mm), preferably 0.25 to 2.0 mm, more preferably 0.5 to 1.5 mm.

When the composite material is to be applied to the outside of a device, it may be preferred to incorporate the composite material in a laminated sheet, in which either one or both of the major surfaces of a sheet of the composite material is coated with a sheet or film of a different material. Materials suitable for coating such a sheet of the composite material include UV-cured acrylates and UV-cured thiol-enes. It may be preferred that the composite material take the form of a laminate which contains two or more layers which contain the metal microtubules and that the microtubules are predominately aligned in distinct directions in at least two of the layers. Alignment of the microtubles in a layer may be carried out by flow alignment during the formation process for non magnetic metals or by forming the matrix sheet or layer while in a magnetic field of known orientation followed by crosslinking of the polymer matrix to lock the orientation in place.

It may also be preferred to provide at least one side of such a sheet of the composite material or such a laminated sheet comprising the composite material with an adhesive or other fastening means, such as velcro.

In an especially preferred embodiment, the composite material forms a conformal coating which encapsulates and isolates components on a printed circuit board. According to this object, external microwave radiation that otherwise would be emitted or absorbed by the electronic components or conductive traces on the board would be contained or eliminated.

In another preferred embodiment, the composite material comprises or consists essentially of (a) a polyvinylbutryl or epoxy matrix; and (b) lipid or halloysite microcylinders which have been coated with a coating of nickel, cobalt, or an alloy of nickel, iron and boron (permalloy) by elecroless deposition and in which the microcylinders are loaded into the matrix in an amount of 0.5 to 15% by weight, based in the total weight of the matrix and the microcylinders.

In another embodiment, the present invention provides a method for making such composite materials, which comprises:

(1) incorporating a plurality of metal microtubules in a polymer or ceramic matrix.

In this embodiment, the polymers, the ceramics, the microtubules, other components, relative amounts of components, and the shape of the composite material are as described above.

The exact means for effecting the step of incorporating the metal microtublues in the polymer or ceramic matrix will depend at least in part on the type of polymer or ceramic which forms the matrix. For example, if the polymer matrix is formed of a thermoplastic polymer, then the metal microtubules may be incorporated by first forming a melt of the thermoplastic polymer and then incorporating the metal microtubules into the melt. The microtubule-containing melt may then be cooled to afford the composite material. Any suitable apparatus for forming the melt and for incorporating the metal microtubules into the melt may be used. Of course, it is to be understood that the cooling step may be carried out in such a way to afford the composite material in the form of a desired shape. For example, the melt may be extruded or cast into a mold or extruded as a sheet.

It is preferred that the viscosity of the melt be maintained at a sufficiently high value to prevent or reduce any settling of the microtubule while cooling in the melt. The viscosity of the thermoplastic melt may be controlled by any conventional method, such as controlling the temperature of the melt and/or controlling the amount of plasticizer, if any, added to the melt.

When the polymer or ceramic matrix is formed by curing polymer precursor(s) or ceramic precursor(s), then the metal microtubules may be conveniently incorporated into the polymer or ceramic matrix by simply adding the metal microtubules to the polymer or ceramic precursor(s) prior to completion of the curing. Curing of the microtubule-containing mixture then affords the composite material. Once again, this step may be carried out to afford the composite material in the form of a desired shape. For example, the precursor components and the metal microtubules may be cured in a mold of the desired shape. Alternatively, the final or desired shape may be obtained by cutting, sanding, or machining the composite material.

In one preferred embodiment, the polymer matrix is a resin which is comprised of two liquid components, a base component and a curing agent. The components of the matrix resin are mixed immediately before use and will eventually harden to form a solid matrix. A liquid mixture of tubules and freshly-mixed resin may be placed within a mold and cured. By this method, a dry, flexible matrix of defined dimensions may be formed. The composite is subsequently removed from the mold and sanded to the desired size and shape or used as is. Alternatively, the liquid mixture may be poured, or pulled by vacuum forces, directly into an electronic device where it fills the cavities of the device. Accordingly, the mixture then assumes the shape of the internal voids as it cures. In either embodiment, the mixture cures in place without appreciable shrinkage.

In another embodiment, the present invention provides intermediates, which are useful for forming the present composite materials and which comprise:
 (a) a polymer matrix precursor or ceramic matrix precursor; and
 (b) a plurality of metal microtubules dispersed within said polymer matrix precursor or ceramic matrix precursor.

In this embodiment, the present intermediates, the polymer precursor(s), the ceramic precursor(s), the microtubules, other components, relative amounts of components, and the shape of the composite material are as described above. Thus, when the matrix is a polymer resin, the polymer matrix precursor may be the uncured resin. When the matrix is a ceramic, the ceramic matrix precursor may be the uncured ceramic.

In another embodiment, the present invention provides electronic devices, which comprise a microwave-attenuating composite, said composite comprising
 (a) a polymer or ceramic matrix; and
 (b) a plurality of metal microtubules dispersed within said polymer or ceramic matrix.

In the present devices, the polymers, the ceramics, the microtubules, other components, relative amounts of components, and the shape of the composite material are as described above. The present devices may be any in which it is desired to attenuate microwaves originating from the device itself or external to the device. Examples of such devices include antennas, repeaters, amplifiers, circuit boards, platform fuselages, wing tips, removable panels, multichip modules, antennas for cell phones, microwave ovens, NMRs (shielding), computers (shielding), etc.

In one preferred embodiment, the composite containing the metal microtubules takes the form of an article of clothing, which may be connected to an electronic device, such as a cellular telephone. In this case, the article of clothing can be used as an inconspicuous antenna for the electronic device. In this embodiment, the metal microtubules may be contained in either electrospun polymeric fibers or in a sheet of highly flexible polyurethane in an amount of between 1% and 50% by weight to provide a personal communications antenna for transmission over a range of frequencies when added to clothing to form a flexible antenna for wear.

When it is desired to shield components within the device from one another, then it will be preferred to place the composite material inside the device and between those components. When it is desired to protect the environment (including the user(s) and other devices) from radiation emitted from the device, then it will be preferred to fully or partially surround the components of the device with the composite material. In this case, the composite material may be placed inside and/or outside any housing or casing. When it is desired to protect the device from radiation originating from the environment (including ambient radiation and/or other devices), then it will be preferred to fully or partially surround the components of the device with the composite material. In this case as well, the composite material may be placed inside and/or outside any housing or casing.

In a particularly preferred embodiment, the device contains a printed circuit board, and the composite material is a non-conductive polymer matrix with a suitable loading of metal microtubules (1 to 20% by weight) which forms a conformal coating. This conformal coating encapsulates and isolates the components on the printed circuit board. In this embodiment, external microwave radiation that otherwise would be emitted or absorbed by the electronic components or conductive traces on the board is contained or eliminated.

In another embodiment, the present invention provides a method for preparing such devices by:
 (1) incorporating a microwave-attenuating composite material in an electronic device, wherein said microwave-attenuating composite material comprises:
 (a) a polymer or ceramic matrix; and
 (b) a plurality of metal microtubules dispersed within said polymer or ceramic matrix.

In this method, the polymers, the ceramics, the microtubules, other components, relative amounts of components, the shape of the composite material, and devices are as described above.

In a particularly preferred embodiment, the device contains a printed circuit board, and the matrix precursor is a liquid mixture of a non-conductive polymer matrix with a suitable loading of microtubules (1 to 50% by weight) which is used to form a conformal coating. This conformal coating encapsulates and isolates components on the printed circuit board. In this embodiment, external microwave radiation that otherwise would be emitted or absorbed by the electronic components or conductive traces on the board is contained or eliminated.

In another embodiment, the present invention provides a method for attenuating microwaves between a source point and a detection point by:
 (1) placing a microwave-attenuating composite material between said source point and said detection point, wherein said microwave-attenuating composite material comprises:
 (a) a polymer or ceramic matrix; and
 (b) a plurality of metal microtubules dispersed within said polymer or ceramic matrix.

In this method, the polymers, the ceramics, the microtubules, other components, relative amounts of components, and shapes of the composite may be as described above. Preferably, the method involves the use of a sufficient thickness or amount of the present composite material to achieve a 10 dB (i.e., 90%) or higher attenuation of the radiation.

The metal tubule-filled composite materials described in this disclosure effectively attenuate or absorb a broad spectrum of the radio frequency spectrum and microwave radiation. The materials are low in density, effective at a broad range of frequencies even when very thin, able to be cast or molded into a variety of shapes and sizes, and stable at temperatures between −20° C. and 120° C. and at any relative humidity.

These materials are suitable for use in electronic equipment on military platforms because of their lightweight, high performance, and durability in the operating environment. Weight savings translate directly into decreased fuel consumption and extended duty cycles.

Potential uses extend beyond commercial applications to many military applications. With the technological advances in electronics, more and more equipment and appliances are emitting electromagnetic radiation. The Federal Communications Commission has established rules and regulations to control and enforce limits on electromagnetic interference (EMI) and radio frequency interference (RFI). A microwave oven is an example of a household device which may leak microwaves and which will benefit from the use of lightweight, thin microwave absorbing materials. Such materials may also be used in the EMI filters and low frequency chokes of input and output filters in switched mode power supplies.

Prior to the present invention, it was not recognized that composite materials with the aforementioned properties may be made from an elastomeric polymer such as an epoxy, polyurethane or siloxane, wherein the polymer may contain hollow cylinders of a metal or metallic-coated substrates measuring 1 to 100 microns long by 0.5 microns in diameter or may contain conductive particles consisting of tubular morphologies and/or other complementary geometric shapes.

One important feature of the use of the mixed components of elastomeric resins (e.g., a polyvinylbutryl or epoxy matrix) to prepare the composite according to the present invention is that they have a sufficiently low viscosity, and the addition of up to 14 percent by weight of tubules produces a fluid mixture which may be poured or aspirated with ease. Halloysite tubules offer the ability to use far more energetic means of mixing the metallic tubules and the resin without the problem of shear-induced aspect ratio reduction.

A second important feature of the use of the mixed components of the resins described above is that they contain no volatile materials. Thus, there is no evaporation during curing and the resulting composite closely resembles the shape of the mold.

The mixed components may be poured into an open mold. Curing the resin produces a solid, which conforms to the shape of the mold surfaces but may be domed or dished on the open face.

The mixed components may be poured or forced under pressure into a mold, which is then closed. Once cured, the resulting resin is a solid, which conforms to the exact shape of the mold.

Alternatively, the mixed components may be sucked into or forced under pressure into the internal cavities of a complex device such as a cellular telephone. The resin surrounds and encapsulates the internal parts and cures in place without shrinkage.

The desired quantities of metal particles and matrix material may be simply weighed out and combined in a beaker. In order to lower viscosities and improve mixing, the matrix materials may be warmed to 40-60° C. By this method, the time available before the matrix begins to cure is reduced. Accordingly, this time must be taken into account (e.g., pot life for the commercial urethanes is usually from 30 to 90 minutes). Antifoaming agents may be added to the mixture to prevent the formation of bubbles. Other additives may also be mixed in at this time to improve either the mechanical or the electrical properties of the composite. In addition, small amounts of additives may be added to improve the ease of application, storage stability, air release, tubule wetting, tubule flocculation, ease of processing, or other properties of the composite.

Since the quantities of metal particles may be as high as 60% percent by weight, the resulting mixtures may have very high viscosities. In this case, the mixing can be laborious and time consuming, and also can cause breakage of the metallized tubules. Therefore, it is preferred that the minimum amount of stirring with the minimum amount of force be used to avoid breakage.

If lower amounts of metal particulate additives are used, the mixture may have a relatively low viscosity, which may allow the mixture to be readily poured into a mold. Therefore, a panel may be formed in an open container, i.e., without a lid. In this case, the mold must be carefully balanced to insure uniform thickness.

When more heavily loaded mixtures with high viscosities are utilized, pouring and self-leveling are not practical options. Accordingly, the mixture may be spread with a spatula in a mold. The mixture may then placed in a vacuum oven at about 40 to 60° C. and pumped until most of the bubbles are removed (about 5 minutes). Then the mold and contents may be covered with a lid and allowed to cure at room temperature. Spacers at the edge of the mold establish the thickness of the mixture, as it is hardening. An antistick surface may used in the mold to allow easy demolding of the cured composite.

The present composite is a mixture of electrically conductive metal particles in an insulating matrix. Addition of metal powder to a mixture eventually results in sufficient metal to metal contacts to produce a conductive composite. This phenomenon is described as percolation and constitutes a phase transition in the material. The loading with metal, which corresponds to the onset of percolation, is termed threshold loading. Along with the onset of percolation there is also a sharp increase in the permittivity of the composite. The "real" part of the dielectric constant increases steadily with loading density, reaching a maximum near the threshold loading. The "imaginary", or lossy, part of the dielectric response increases slowly with loading, and near the threshold jumps suddenly to large values, becoming larger than the "real" part above the threshold.

Panels of the composite can be placed on the surface separating two antennas, one a receiving and one a sending antenna. The change in coupling between the antennas due to the tubule based film between them is termed attenuation. Attenuation is a function of the loading and the thickness of the composite. In order for the energy which couples the two antennas to be absorbed it must travel inside the composite, effectively being wave-guided by the composite. There is a maximum wavelength (minimum frequency) that is allowed to be guided by a layer; effectively equal to a half wavelength in the material taking into account the index of refraction of the composite. Thus, to accommodate long wavelengths, the composite panel either must be physically thick or it must have a high permittivity.

Panels made according to the present invention more typically have a thickness of 1.1 to 1.4 mm with tubule loading densities of about 15 volume percent and permittivities of about 30 to 50, that produced attenuation of antenna coupling of about 10 fold (10 dB) at 10 GHz.

Other features of the invention will become apparent in the course of the following descriptions of exemplary embodiments, which are given for illustration of the invention and are not intended to be limiting thereof.

EXAMPLES

In the following examples, and throughout this specification, all parts and percentages are by weight, and all temperatures are in degrees Celsius, unless expressly stated to be otherwise. Where the solids content of a dispersion or solution is reported, it expresses the weight of solids based on the total weight of the dispersion or solution, respectively. Where a molecular weight is specified, it is the molecular weight range ascribed to the product by the commercial supplier, which is identified. Generally this is believed to be weight average molecular weight.

1. Tubule Preparation.

In order to ensure the proper final concentration sufficient for activiation of the polyion reinforced lipid, the colloidal Pd(II) catalyst dispersions suitable for use in the invention were prepared in the following manner.

A stock 1.0 M aqueous solution of NaCl was first prepared by dissolving 58.44 g NaCl (Fisher Scientific Cat. # S-271; M.W.=58.44 g/mole; Certified A.C.S. Reagent; Lot # 865603) in approximately 750 mL deionized (DI) water (Nanopure II® Water Still; 17.6 MΩ resistivity). The solution was then diluted to 1 L with DI water. An aqueous 0.1 M morpholinoethane sulfonate (MES), pH 5 buffer stock solution was separately prepared by dissolving 2.13 g of morpholinoethane sulfonic acid (98%; Aldrich Chemical Cat. # 16,373-2; M.W.=213.26 g/mole; Lot # EF04410EF) in approximately 50 mL DI water and titrating dropwise with a freshly prepared 2 M aqueous solution of NaOH (99.99%; Aldrich Chemical Cat. #30,657-6; M.W.=40.00 g/mole; Lot #LG02424KG) to pH 5.0. The resulting solution and aqueous washings were transferred to a 100-mL volumetric flask and diluted to 100 mL with DI water to yield a stock buffer solution.

For the preparation of the metallization catalyst, 60 mg of $Na_2PdCl_4.3H_2O$ (98%; Aldrich Chemical Cat. #20,581-8; M.W.=294.19 g/mole; Lot #TF13323 PF) was transferred to a clean 50 mL volumetric flask. A 1.5-mL aliquot of the 1.0 M NaCl (aq) stock solution was added to the flask to completely dissolve the $Na_2PdCl_4.3H_2O$. A 10-mL portion of 0.1 M, pH 5 MES (aq) stock buffer was immediately added to the flask and the solution was diluted to the 50 mL mark with DI water. The contents of the flask were mixed by inversion of the flask 25 times. The flask was then incubated for 20 hours in a temperature-controlled water bath at 23±1° C. Subsequent to incubation, a 5-mL aliquot of the resulting straw-yellow colored dispersion was removed by pipet and discarded. A 5-mL aliquot of the 1.0 M NaCl (aq) stock solution was added to the contents of the flask by pipet and the flask was mixed by inversion as described above to produce the final metallization catalyst dispersion, hereinafter referred to as PD1A.

The concentrations of Pd(II), chloride ion, and total MES in the final pH 5 PD1A dispersion are: [Pd(II)]~3.67 mM; [Cl$^-$]~127 mM; [MES]~18 mM (approximate values). This metallization catalyst exhibited a useful lifetime of approximately 14 days at room temperature before destabilization and bulk precipitation of Pd(II) salts occurred. This metallization catalyst promoted essentially complete electroless metallization (i.e., >95% coverage) on more than 90% of the lipid tubules treated, as described below.

A preferred metallization catalyst for tubule metallization may be produced with a slight modification of the above catalyst formulation. The preferred metallization catalyst formulation, hereinafter referred to as catalyst PD1B, was prepared exactly as described for catalyst PD1A with one modification: the solid $Na_2PdCl_4.3H_2O$ was initially dissolved using 1.0 mL, rather than 1.5 mL, of 1.0 M NaCl (aq) stock solution. This resulting metallization catalyst solution was a dark yellow-brown to orange-brown color after preparation. The concentrations of Pd(II), chloride ion, and total MES in the final pH 5 PD1B dispersion are: [Pd(II)]~3.67 mM; [Cl$^-$] ~118 mM; [MES]~18 mM (approximate values). Although the useful lifetime of this metallization catalyst before destabilization and bulk precipitation of the Pd(II) salts is reduced to approximately 10 days at room temperature, use of PD1B catalyst leads to essentially complete electroless metallization (i.e., >95% metal coverage) on more than 95% of the treated lipid tubules, as described below.

The advantage of using these palladium metallization catalysts (i.e., PD1A or PD1B) to catalyze the electroless metallization of the lipid tubules over other methods using Pd/Sn catalysts (see, e.g., U.S. Pat. No. 6,013,206) is that it (1) eliminates the need to remove the alcoholic solvent mixture prior to the electroless metalization step by dialysis, (2) eliminates the need for acidic salts that tend to disrupt the structure of the microtubules, and (3) eliminates the need to conduct an activation step for the stannous palladium commercial catalyst system used in previous methods as elucidated in U.S. Pat. No. 6,013,206, which is incorporated herein by reference herein. Another advantage is that the number of filtrations (which are typically used after each step in the Pd/Sn catalysis method) is reduced. As few as one filtration to remove the PD1A or PD1B metallization catalyst is required. This is beneficial, because filtrations are the source of much of the breakage of the tubules, which is detrimental to the intended use.

In another embodiment, halloysite, a clay which occurs naturally as hollow cylinders, may be metallized by first treating the surface of the clay with an active metallization catalyst as described above. In this case, the clay need not be withdrawn from the center of the metallic tubule before use.

Washing and pin milling until a reduced particle size is achieved may be carried out to first prepare the clay. It is preferred that the clay be prepared from a deposit of halloysite that is comprised of essentially all tubular materials. These materials are blunged to reduce the particle size and washed with Calgon salts to remove any exogenous allophate materials. This is followed by the Pd(II) catalysis step outlined above, which entails simple suspension of the clay at a near neutral pH followed by the addition of the aqueous palladium metallization catalyst. Subsequently, centrifugation or flitration may remove the excess catalyst and the clay is resuspended in water. The process is repeated until all unbound catalyst is removed. Following removal of the catalyst, the halloysite is capable of being electroless plated by the same process as the lipid microtubles. The halloysite clay is available in a range of sizes up to an aspect ratio of 40-50. Specific note may be made of the following: Copper Coated, Nickel Coated, Cobalt Coated, or Iron Coated halloysite tubules, Nickel or Cobalt over Copper coated halloysite tubules, and Iron, Nickel and Boron alloy coatings over halloysite tubules. The halloysite materials are described more fully in U.S. Pat. No. 5,651,976, which is incorporated herein by reference in its entirety.

Elastomeric Matrix Resin Example 1

Elastomeric Polyurethane Matrix Resin

A polyether diol, a polyether triol, metal-plated tubules and a curing catalyst are mixed and then cured with a diisocyanate prepolymer containing a plasticizer. In a preferred embodiment, a base component and a curing agent are made separately as follows:

Base Component: Mix thoroughly the following:
  Diol: 2.54 g, poly(propylene glycol) [C. A. 25322-69-4], having a weight-average molecular weight of about 425, a viscosity of 80 centistokes at room temperature, and a density of 1.004 g/mL.
  Triol: 0.41 g, trimethylolpropane propoxylate [C. A. 25723-16-4], having a molecular weight of 308 and a density of 1.040 g/mL.
  Curing Catalyst: 0.03 g, dibutyltin dilaurate [C. A. 77-58-7], having a molecular weight of 631 and a density of 1.066 g/mL.
  Metallized Tubules: metal microtubules with a wall thickness of 10 to 2000 nm or halloysite microcylinders with a metallic coating thickness of 10 to 1000 nm are mixed to a final weight percentage of 1 to 50 percent of the base component with loadings from 10 to 20 percent preferred.

Curing Agent: Mix thoroughly the following:
  Diisocyanate prepolymer, 9.60 g, poly(propylene glycol) terminated with toluene-2,4-diisocyanate [C. A. 9057-91-4], having a weight-average molecular weight of about 1000, a viscosity of 12,500 centipoise at 40° C., and an average isocyanate content of 8.4 weight percent.
  Plasticizer, 0.24 g, dibutyl adipate [C. A. 105-99-7], having a molecular weight of 258 and a density of 0.962 g/mL.

The base component and curing agent are then blended together thoroughly, poured into a mold, and allowed to cure at room temperature. In this manner a tough, elastomeric composite with a Shore A Hardness of 52 is produced.

Elastomeric Matrix Resin Example 2

Elastomeric Polyurethane Matrix Resin

The elastomeric matrix resin may be made with a commercial polyurethane elastomer as the base component. A suitable product is LS-40 from BJB Enterprises, Inc. (14791 Franklin Avenue, Tustin, Calif. 92780). According to this method, 90 g of the base component is mixed with the curing agent (100 g), poured into a mold, and allowed to cure at room temperature. The resulting resin has a Shore A hardness of 40, a tensile strength of 490 pounds per square inch, and an elongation of 800%.

Elastomeric Matrix Resin Example 3

Elastomeric epoxy matrix resin.

The diglycidyl ether of bisphenol A, diluted with a monoepoxide, is mixed with a polyglycol diglycidyl ether and cured with a polyoxypropylenediamine. In a preferred embodiment, a base component and a curing agent are made separately as follows:

Base Component: Mix thoroughly the following:
  A liquid epoxy resin (46 g) containing the diglycidyl ether of bisphenol A and butyl glycidyl ether. The mixture has a viscosity of 5-7 Poise, a specific gravity of 1.13, and an epoxy equivalent weight of 175-195.
  A polyglycol diepoxide resin (31 g) having a viscosity at 25° C. of 30-60 centipoise, a specific gravity at 25° C. of 1.14, and an epoxy equivalent weight of 175-205.

Curing Agent:
  A polyoxypropylenediamine (23 g) having a viscosity at 25° C. of 9 centipoise, a specific gravity at 20° C. of 0.948, and an average molecular weight of 230.

The base component and curing agent are then thoroughly blended together, poured into a mold, and allowed to cure at room temperature. A tough, elastomeric resin with a Shore A hardness of 65 is obtained.

Elastomeric Matrix Resin Example 4

Elastomeric siloxane matrix resin.

A vinyl-terminated polydimethylsiloxane and a copolymer of methylhydrosilane and dimethylsiloxane are mixed with a curing catalyst. In a preferred embodiment, a base component and a curing agent are made separately as follows:

Base Component: Mix thoroughly the following:
  A vinyl-terminated polydimethylsiloxane, 50 g, having a molecular weight of 28,000, a viscosity of 1000 centistokes, a specific gravity of 0.97, and containing 0.18 to 0.26 weight percent of vinyl groups.
  A curing catalyst solution, 15 microliters, formed from 39 parts of n-hexane and one part of 1,2-divinyltetramethyldisiloxane containing 3.0 to 3.5 weight percent of platinum, which has a viscosity of 0.7 centistokes and a specific gravity of 0.81. Further, one milliliter of this solution contains one milligram of platinum.

Curing Agent:
  A copolymer of methylhydrosilane and dimethylsiloxane, 1.5 g, having a molecular weight of 1900-2000, a viscosity of 25-35 centistokes, a specific gravity of 0.98, and containing 25-30 mole percent of methylhydrosilane moieties.

The base component and curing agent are thoroughly blended together, poured into a mold, and allowed to cure at room temperature. By this method a tough, elastomeric composite is produced.

Elastomeric Matrix Resin Example 5

Elastomeric siloxane matrix resin.

The elastomeric matrix resin may be made using a commercial siloxane elastomer. Smooth-Sil 900 from Smooth-On, Inc. (2000 St John Street, Easton, Pa. 18042) is suitable for this purpose. According to this method, 100 g of the base component is mixed with the curing agent (100 g), poured into a mold, and allowed to cure at room temperature. The resulting resin has a Shore A hardness of 35, an elastic modulus of 77, and an elongation of 175%.

Obviously, numerous modifications and variations on the present invention are possible in light of the above teachings. It is therefore to be understood that within the scope of the appended claims, the invention may be practiced otherwise than as specifically described herein.

Unless otherwise defined, all technical and scientific terms used herein have the same meaning as commonly understood by one of ordinary skill in the art of polymers. Although methods and materials similar or equivalent to those described herein can be used in the practice or testing of the present invention, suitable methods and materials are described herein. All publications, patent applications, patents, and other references mentioned herein are incorporated by reference in their entirety. In case of conflict, the present specification, including definitions, will control. In addition, the materials, methods, and examples are illustrative only and are not intended to be limiting.

The invention claimed is:

1. A composite material, comprising a plurality of metal microtubules, wherein said metal microtubules are dispersed in either a flexible polyurethane or a fabric or a sheet formed from polymeric fibers, and wherein said metal microtubules are present in an amount of 1 to 15 weight %, based on the total weight of said composite material.

2. The composite material of claim 1, which forms or is part of an article of clothing.

3. The composite material of claim 1, which is a flexible antenna.

4. The composite material of claim 1, which is a personal communications antenna for transmission over a range of frequencies when added to clothing to form a flexible antenna for wear.

* * * * *